US011725314B2

(12) United States Patent
Terai et al.

(10) Patent No.: US 11,725,314 B2
(45) Date of Patent: Aug. 15, 2023

(54) GRADING METHOD FOR KNITTED PRODUCTS AND A GRADING SYSTEM THEREFOR

(71) Applicant: SHIMA SEIKI MFG., LTD., Wakayama (JP)

(72) Inventors: Koichi Terai, Wakayama (JP); Takenori Takatsuka, Wakayama (JP)

(73) Assignee: SHIMA SEIKI MFG., LTD., Wakayama (JP)

( * ) Notice: Subject to any disclaimer, the term of this patent is extended or adjusted under 35 U.S.C. 154(b) by 144 days.

(21) Appl. No.: 17/168,823

(22) Filed: Feb. 5, 2021

(65) Prior Publication Data

US 2021/0246585 A1 Aug. 12, 2021

(30) Foreign Application Priority Data

Feb. 6, 2020 (JP) .................................. 2020-018815

(51) Int. Cl.
*D04B 35/00* (2006.01)
*A43B 23/02* (2006.01)
*D04B 37/02* (2006.01)

(52) U.S. Cl.
CPC ............ *D04B 35/00* (2013.01); *A43B 23/025* (2013.01); *D04B 37/02* (2013.01); *D10B 2501/043* (2013.01)

(58) Field of Classification Search
CPC ........................................... G05B 2219/45194
USPC .................. 700/130, 131, 132, 141, 137
See application file for complete search history.

(56) References Cited

U.S. PATENT DOCUMENTS

| 5,163,006 | A | * | 11/1992 | Deziel | A41H 3/007 700/87 |
| 5,511,394 | A | * | 4/1996 | Shima | D04B 1/126 66/54 |
| 5,757,661 | A | * | 5/1998 | Surville | G06Q 10/043 702/155 |
| 7,386,361 | B2 | * | 6/2008 | Nobuyuki | D05B 19/10 700/138 |
| 10,626,530 | B2 | | 4/2020 | Terai et al. | |

(Continued)

FOREIGN PATENT DOCUMENTS

JP 61184547 A * 8/1986 .............. G03F 1/90
WO 2017/183374 A1 10/2017

*Primary Examiner* — Khoa D Huynh
*Assistant Examiner* — Grace Huang
(74) *Attorney, Agent, or Firm* — Rothwell, Figg, Ernst & Manbeck, P.C.

(57) ABSTRACT

Pattern data for at least two sizes are converted to knit data, regarding knitted products to be graded. Regarding the knit data for at least two sizes, characteristic points specifying shapes of the knitted products and intermediate shapes specifying shapes of the knitted products between the characteristic points are generated. By interpolating or extrapolating the characteristic points and the intermediate shapes, according to a desired size of the knitted products, characteristic points and intermediate shapes for the desired size are generated. Closed loops are generated by connecting the characteristic points and the intermediate shapes, and knit data for the desired size is generated by allocating knitted stitches within patterns specified by the closed loops. Without pattern data for intermediate sizes, knit data for the intermediate sizes are generated from the two size knit data.

4 Claims, 8 Drawing Sheets

(56) References Cited

U.S. PATENT DOCUMENTS

2007/0173968 A1* 7/2007 Koichi .................... G06F 30/20
700/141
2020/0233994 A1* 7/2020 Terai ....................... G06T 17/20

* cited by examiner

F I G. 1
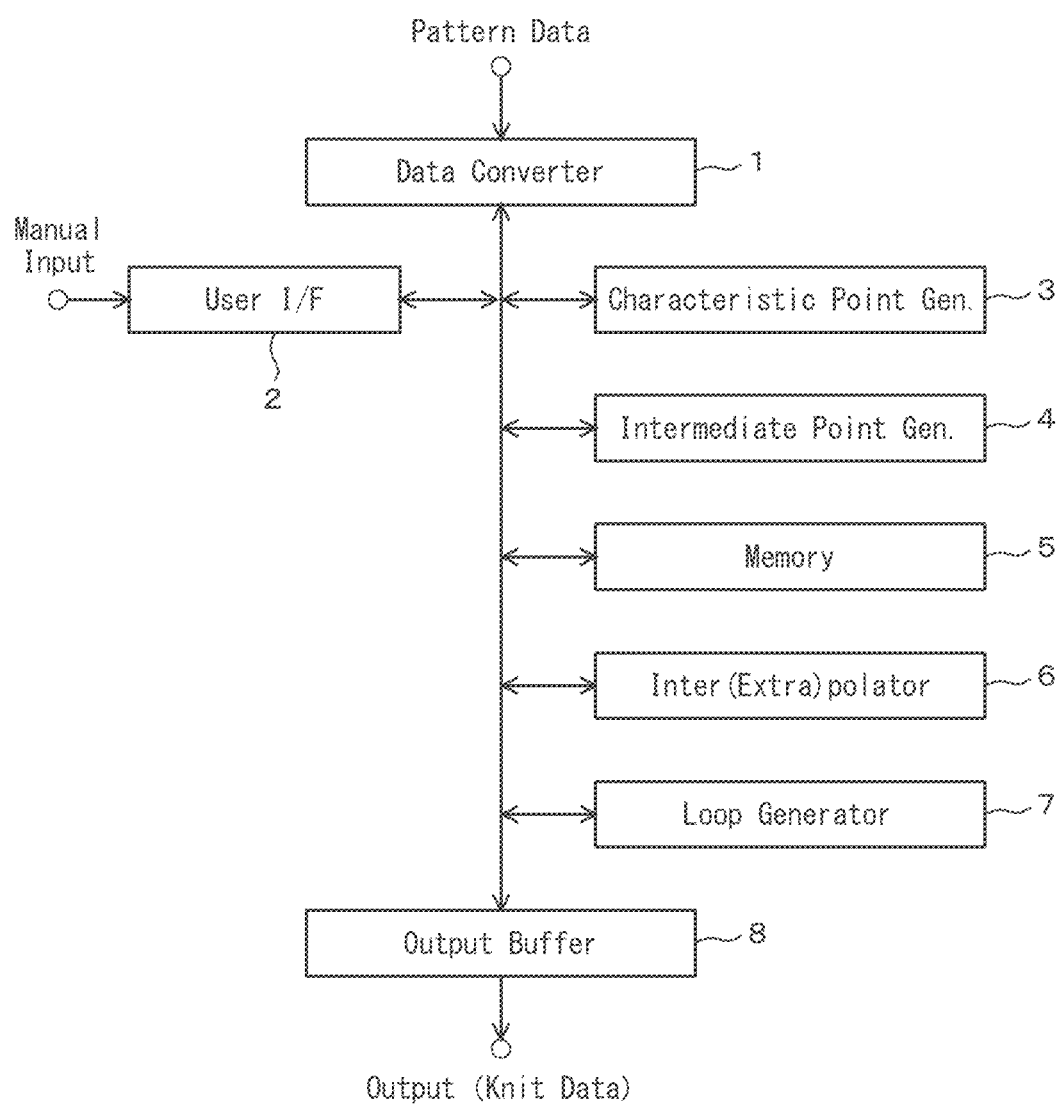

F I G. 8
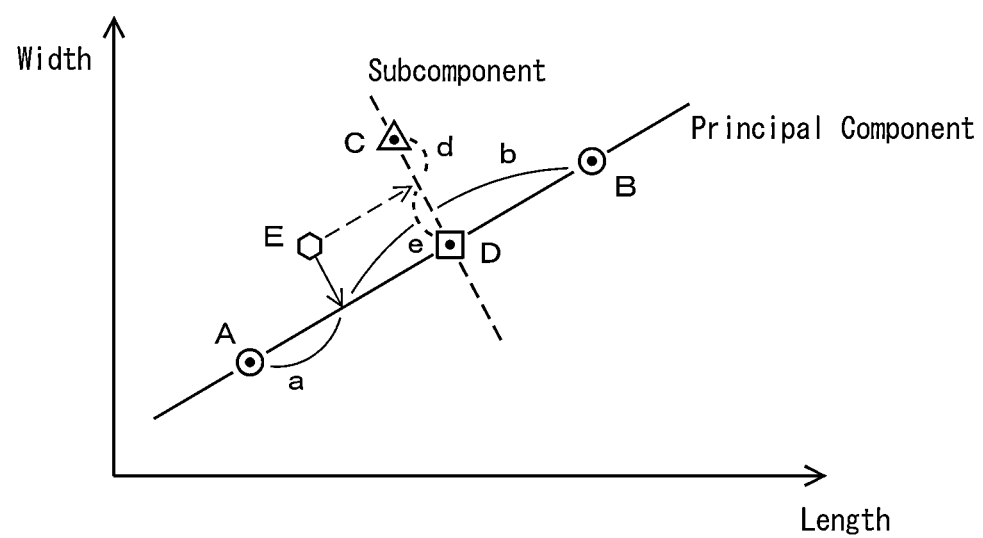

GRADING METHOD FOR KNITTED PRODUCTS AND A GRADING SYSTEM THEREFOR

FIELD OF THE INVENTION

The present invention relates to a grading method and a grading system for knitted products and, in particular, to the grading of knitted products such as apparel products: shoe uppers; socks; clothes; and headgears, and industrial textiles or materials.

BACKGROUND ART

Shoe uppers of the same design generally have plural sizes. Therefore, for each size of shoe uppers, one pattern data has to be prepared and then has to be converted into knit data for each size. Here, "knit data" refers to data for driving knitting machines. When one pattern data is converted into the knit data and when shoe uppers are knitted according to the knit data, the knitted shoe uppers often do not fit the pattern data. Therefore, it has been needed to revise the knit data through trial and error until shoe uppers fitting the pattern data become knitted. However, it requires a heavy workload to revise knit data through trial and error for a variety of sizes.

The applicant has proposed in Patent Document 1 (WO2017/183374A) a grading method for shoe uppers. First, knit data for two sizes are generated from the pattern data for various sizes. Then, the knit data are revised such that shoe uppers can be knitted in accordance with the pattern data. For the revision of the knit data, the shoe uppers can be actually knitted and can be compared with the pattern data. When the simulation of shoe uppers can be expected highly accurate, the simulation image of shoe uppers may be produced according to the knit data and may be compared with the pattern data.

Regarding the revised knit data for the two sizes, the changes from the first knit data are obtained and are converted to the revision amounts to the pattern data. The revision amounts for the two sizes are interpolated or extrapolated to the revision amounts to the pattern data for other sizes. Then, the revised pattern data are converted into knit data. Consequently, knit data are resultant for other sizes in accordance with their pattern data.

There are occasions where grading of knit data is required to a wide variety of sizes for other knitted products than shoe uppers. For example, regarding socks, clothes, headgears, supporters, and industrial materials, grading of knitted products is needed to various sizes.

PRIOR DOCUMENTS LIST

Patent Document

Patent Document 1: WO2017/183374A

SUMMARY OF THE INVENTION

Problem to be Solved by the Invention

When conversion from pattern data to knit data is difficult, the algorithm in Patent Document 1 is not effective, since conversion of pattern data to knit data is needed for each size. For example, regarding knitted products to be knitted by flechage knitting, the conversion from the pattern data to the knit data is a complex job and needs skillful operators.

As a result, it is troublesome to convert the pattern data to knit data for each size. Further, When the supposition that pattern data for each size is available does not hold, grading becomes very difficult.

The object of the invention is to provide a grading method and a grading system such that knit data for intermediate sizes are producible from, for example, knit data for two sizes without the intermediate size pattern data, and the conversion from pattern data to knit data is not needed for the intermediate sizes.

Means for Solving the Problem

A grading method for knitted products according to the invention, utilizes a grading system programmed and configured to convert pattern data of knitted products to knit data for driving knitting machines and generates, from pattern data of a knitted product for at least two sizes, knit data of the knitted product for other sizes. The grading method is characterized in that the following steps are performed by the grading system:

a: converting pattern data of at least two sizes of knitted products to be graded to knit data;

b: generating characteristic points specifying shapes of the knitted products, regarding the knit data for said at least two sizes converted in step a, automatically or interactively based upon user's inputs;

c: generating intermediate shapes specifying shapes of the knitted products between the characteristic points, automatically or interactively based upon user's inputs;

d: interpolating or extrapolating the characteristic points and the intermediate shapes according to a desired size of the knitted products so as to generate characteristic points and intermediate shapes for the desired size;

e: generating closed loops by connecting the characteristic points and the intermediate shapes for the desired size; and f: generating knit data for the desired size so as to allocate knitted stitches within patterns specified by the closed loops.

A grading system for knitted products according to the invention comprises a data converter programmed and configured to convert pattern data of knitted products to knit data for driving knitting machines. The grading system is characterized in that said converter is programmed and configured to convert pattern data of at least two sizes of knitted products to be graded to knit data, and is provided with:

a characteristic point generation means for generating characteristic points specifying shapes of the knitted products, regarding the knit data for said at least two sizes, automatically or interactively based upon user's inputs;

an intermediate shape generation means for generating intermediate shapes specifying shapes of the knitted products between the characteristic points, automatically or interactively based upon user's inputs;

an interpolation means for interpolating or extrapolating the characteristic points and the intermediate shapes according to a desired size of the knitted products so as to generate characteristic points and intermediate shapes for the desired size; and a loop generation means for generating closed loops by connecting the characteristic points and the intermediate shapes for the desired size, and that said converter is programmed and configured to generate knit data for the desired size so as to allocate knitted stitches within patterns specified by the closed loops.

According to the present invention, knit data for various sizes are generated, for example, only from pattern data of two sizes. Therefore, for sizes without the pattern data, their knit data are produced. In addition, the workload is reduced in the conversion from the pattern data to the knit data, because it is enough if the two pattern data, for example, are converted to the knit data. These features are particularly advantageous in the grading of the knit products that require flechage knitting and so on.

Preferably, in said step c, intermediate points specifying the shapes of the knitted products between said characteristic points are generated between said characteristic points as said intermediate shapes, automatically or interactively based upon user's inputs, in said step d, interpolating or extrapolating the generated characteristic points, generated in said step b, and the intermediate points, generated in said step c according to the desired size of the knitted products so as to generate characteristic points and intermediate points for the desired size, and in said step e, the closed loops are generated by connecting the characteristic points and the intermediate points for the desired size. According to this example, the intermediate shapes are approximated by a series of intermediate points, not by curves based upon parameters.

More preferably, in said steps b and c, said characteristic points and said intermediate points are generated so as to specify both outer shape of the knitted products and at least a boundary within the knitted products produced according to knitting process of the knitted products. Knitted products complex to some degree naturally have boundaries within them due to changes in the knitting yarns, the knitting structures, and flechage knitting. The outer shapes of the knitted products and the boundaries within the knitted products can be specified by the characteristic points and the intermediate points and they are interpolated or extrapolated such that the boundaries within the knitted products are interpolated or extrapolated.

Particularly preferably, the knitting data includes flechage knitting, and said boundary includes at least a boundary caused by the flechage knitting. According to the invention, the conversion from the pattern data to the knit data is required only for two sizes, for example, when the knit data include flechage knitting and when the knitted products include various sizes.

General knitted products can be graded, and knitted products for apparel, for example, and in the embodiment knitted products for shoe uppers are graded. The knitting is performed preferably by flatbed knitting machines that can deal with complex pattern data but may be performed by circular knitting machines for relatively simple knitting. In the latter case, knit data for a wide variety of intermediate sizes can be generated, with converting, for example, pattern data for two sizes to knit data.

BRIEF DESCRIPTION OF THE DRAWINGS

FIG. 1 is a block diagram of a grading system according to an embodiment.

FIG. 8 is a schematic view of a two-dimensional grading method along the length and width directions according to the embodiment.

FEATURES FOR CARRYING OUT THE INVENTION

Figure 2:
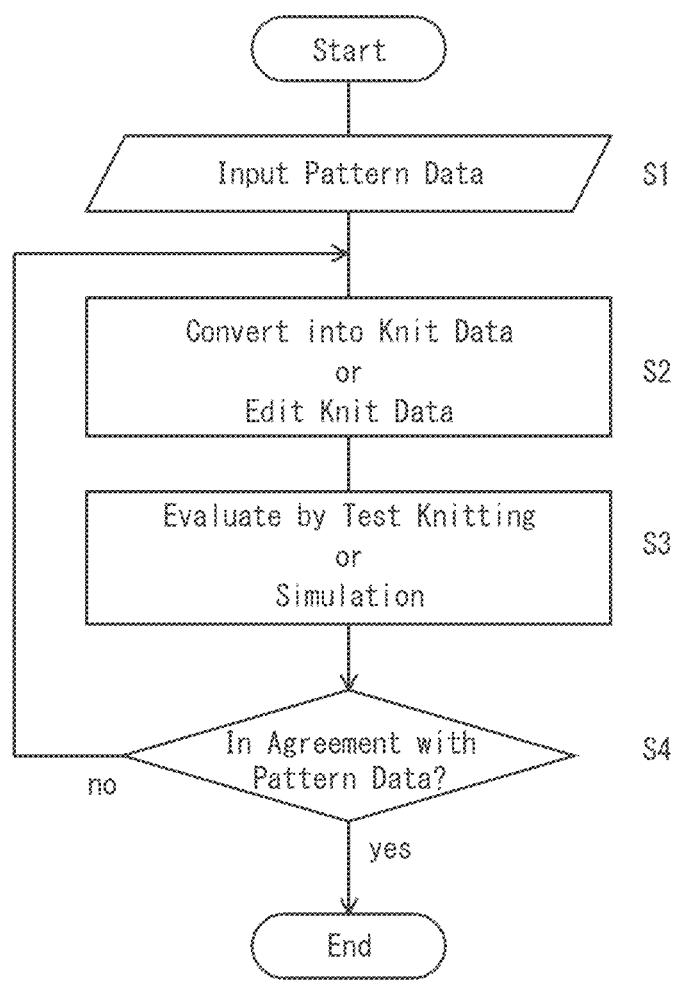
FIG. 2 is a flowchart indicating a conversion algorithm from pattern data for two sizes to their knit data.

The best embodiment for carrying out the invention will be described.

Embodiment

FIGS. 1 to 8 indicate the embodiment and its modifications. FIG. 1 indicates a grading system according to the embodiment. A data converter 1 converts graphical data such as pattern data into knit data, for example, for the two sizes of the maximum and the minimum, automatically or interactively according to user's inputs. Of course, for three or more sizes, the knit data may be generated, or the knit data for two sizes, one a little smaller than the maximum size and the other a little larger than the minimum size, may be generated. Knit data is a kind of data for driving knitting machines and representing the shape of the knitted fabric to be knitted. The knit data specifies, for each stitch, the species of the stitch, the connection relation between the surrounding stitches, and the yarn feeder to be used for feeding the knitting yarn. A user interface 2 is provided with a pointing device such as a mouse, an input means such as a keyboard, a color monitor, and so on, and is used for interactively carrying out the procedures such as the conversion from the pattern data into the knit data and the designation of the characteristic points and the intermediate points.

When flechage knitting is needed, it is difficult, at present, to convert automatically the pattern data into the knit data. Usually, for knitting knitted products in accordance with the pattern data, users have to empirically prepare the knit data and, for example, carry out the test knitting of the knitted products according to the knit data. The users have to evaluate the sizes and the shapes of the knitted products and to revise the knit data until the knitted products become in accordance with the pattern data. Particular examples of shoe uppers shown in FIG. 4 have straight band-like top-line portions 16, 26, and 36; they are circulated so as to form a loop with a large diameter by a series of flechage knitting. Since the series of flechage knitting are needed for remarkably deforming the top-line portions 16, 26, and 36, the conversion from the pattern data into the knit data needs trials and errors. Thus, the conversion for each size from the pattern data into the knit data should be avoided.

A characteristic point generator 3 generates characteristic points regarding knit data already generated by the data converter 1 or during the generation of the knit data by the data converter 1. Generally, boundaries are formed within the knitted fabrics, corresponding to the knitted products, when the knitting of the knitted products uses plural knitting yarns, plural knitted structures, flechage knitting or the like, or the insertion of inlay yarns. The characteristic point generator 3 designates the points representing the outer shape of the knitted fabric and also the points representing the boundaries within the knitted fabric as the characteristic points on the knit data. Namely, the characteristic points are the vertexes on the outer shape of the knitted fabric, the vertexes on the boundaries within the knitted fabric, if any, and bending points on the outer shape or the boundaries. The characteristic point generator 3 may generate the characteristic points automatically. But, if this is difficult, the knit data is represented on the user interface 2, and the characteristic point generator 3 generates interactively the characteristic points with the instructions by the users.

The characteristic point generator 3 designates the characteristic points at the mutually corresponding positions between the knit data for the two sizes, and the number of the characteristic points is the same for knit data of different sizes. In this way, the graphical features represented by the characteristic points are made in common between the knit data for the two sizes and so on.

An intermediate point generator 4 generates intermediate points between the characteristic points so as to connect the characteristic points on the outer shape and on the boundaries of the knitted fabric, if any, on the knit data. The intermediate point generator 4 generates the intermediate points automatically in general, but they may be generated interactively with the user interface 2. For different sizes, the number of the intermediate points is in common among different sizes; the intermediate points are allocated at the mutually corresponding positions among the sizes, on the outer shape of the knitted fabrics and boundaries within the knitted fabrics, if any. It should be noted that, in place of the intermediate points, algebraic curves or line segments can be used to connect the characteristic points so as to designate the intermediate shape between the characteristic points. In that case, the intermediate point generator 4 generates the algebraic curves or the line segments approximating the shapes between the characteristic points of the knitted fabrics, instead of generating the intermediate points between the characteristic points. The approximating algebraic curves and the line segments correspond to the intermediate shapes in claims.

An interpolation and extrapolation unit 6 performs interpolation or both the interpolation and extrapolation between or from the corresponding characteristic points, for example, of the two sizes of knit data of the maximum and minimum and also between the corresponding intermediate points between the sizes. The interpolation and extrapolation generate the characteristic points and the intermediate points for other sizes. When the two sizes of knit data are used, the interpolation and the extrapolation may be linearly performed, and when three or more sizes of knit data are available, the interpolation and the extrapolation may be performed with quadratic curves or the like. When the two size knit data of the maximum and the minimum are used, the characteristic and the intermediate points are interpolated between the two sizes, and in other cases, the characteristic and the intermediate points are generated by both the interpolation and the extrapolation.

A loop generator 7 generates closed loops by connecting the adjacent characteristic and intermediate points in order. Regarding the processing by the loop generator 7, there is no specific reason to distinguish the characteristic points and the intermediate points; both the points designate the outer shape of the knitted fabrics or the boundaries within the knitted fabrics, if any.

The data converter 1 generates knit data such that stitches are allocated within the closed loops. When the boundaries within the knitted fabrics are identified, then, the vertexes of the boundaries needed for the flechage knitting, the boundaries to change the knitting yarns, the boundaries of the knitted structures, and so on are identified. Further, the species of the knit structures within the loops can be identified from those of the initial two sizes. Therefore, based upon the closed loops generated by the loop generator 7, the data converter 1 can generate knit data for other sizes than the initial two sizes. An output buffer 8 outputs the generated knit data to the outside.

FIG. 2 indicates the conversion algorithm from the two size pattern data of the maximum and the minimum into their knit data. In step S1, for example, the two size pattern data of the maximum and the minimum are inputted, and, in step S2, the data converter in FIG. 1 converts the pattern data into the knit data of the two sizes or edits the converted knit data with manual aid. In step S3, the knit products are knitted for the trial according to the converted knit data and are compared with the pattern data. Instead of the test knitting, the shapes of the knit products may be simulated by a computer according to the knit data. The steps S2 and S3 are repeated until the knit products coincide with the pattern data, in other words, fit the pattern data (step S4).

Figure 3:
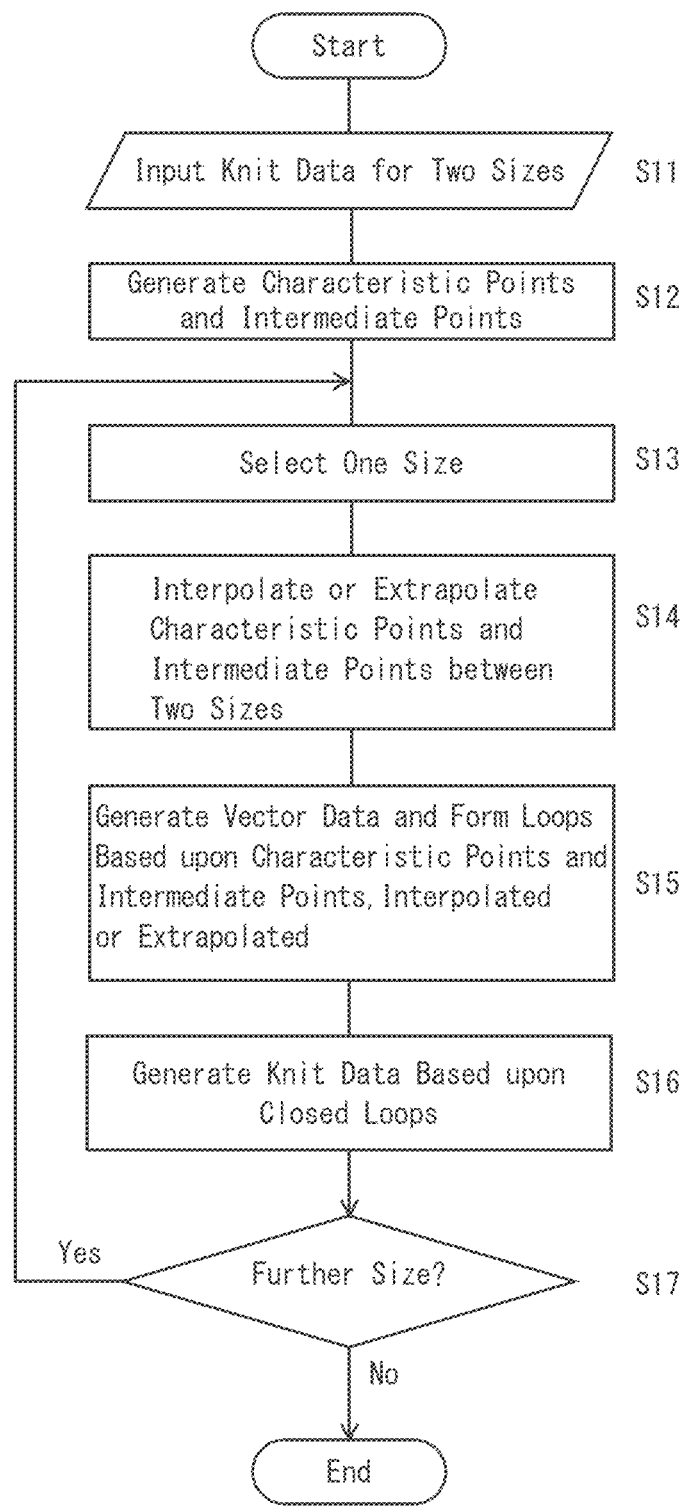
FIG. 3 is a flowchart indicating a generation algorithm of knit data by interpolation or extrapolation.

FIG. 3 indicates the algorithm for generating knit data for other sizes from the knit data for the two sizes according to the embodiment. For example, the two size knit data are inputted (step S11), and the characteristic points and the intermediate points are generated on the knit data automatically or interactively by the characteristic point generator 3 and the intermediate point generator 4 (step S12). Other sizes than the above two sizes are selected one by one, and the following process is executed for each size (step S13 to S17).

The interpolation and extrapolation unit 6 interpolates and extrapolate the characteristic points and the intermediate points between the above two size knit data such that the characteristic points and the intermediate points are generated for other sizes (step S14). In step S15, the loop generator 7 generates vectors connecting the characteristic points and the intermediate points or connecting the intermediate points. When the generated vectors are connected in order, the closed loops are resultant. In step S16, knitted stitches are allocated such that they fill the closed loops and also fill both the closed loops and areas outside the closed loops and within the knitted fabrics when the closed loops are present in the inside of the knitted fabrics on their knit data. When steps S13 to S16 are performed, knit data for one size is generated. Steps S13 to S16 are performed for each size.

Figure 4:
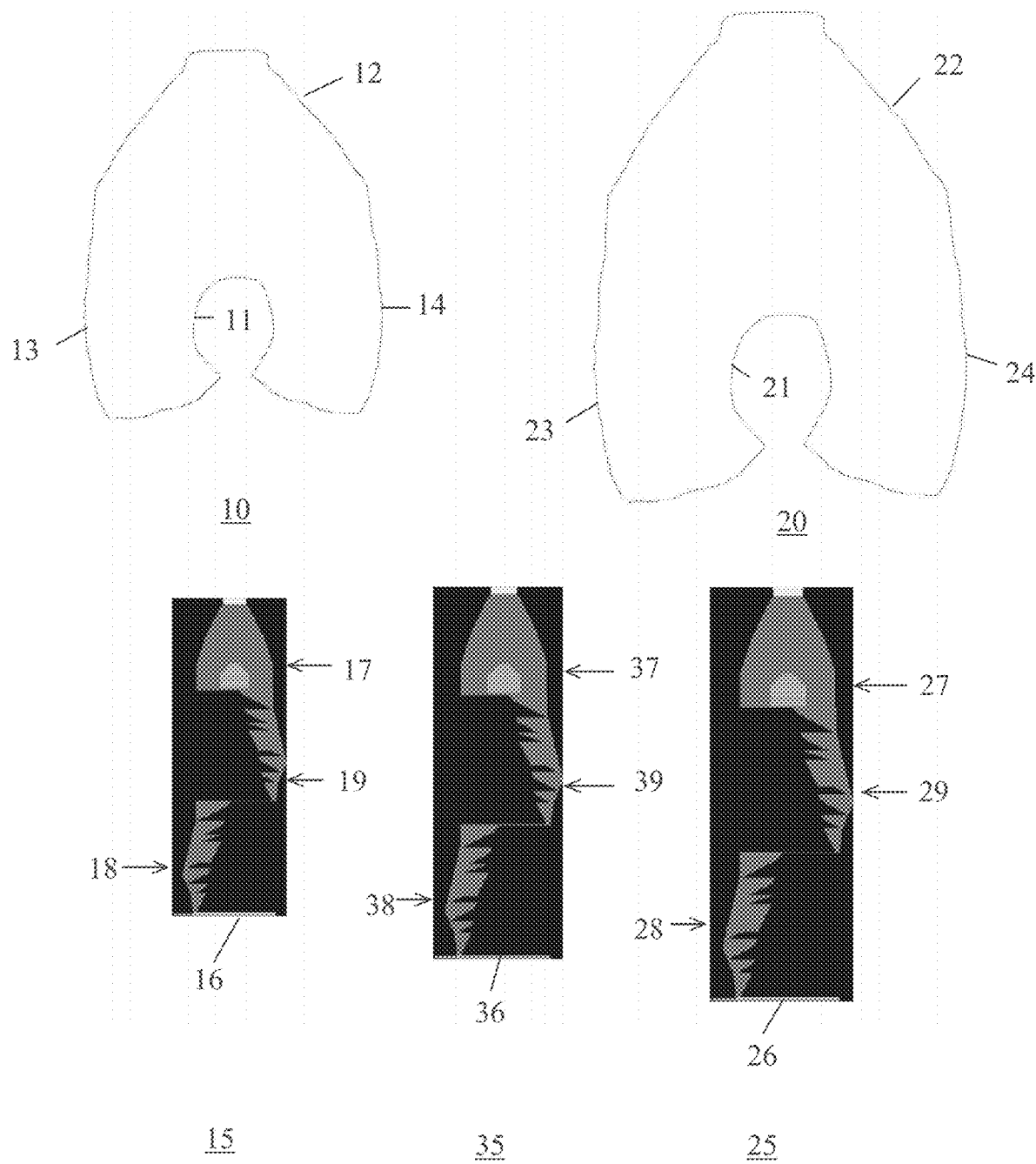
FIG. 4 indicates schematically the two size pattern data of the maximum (20) and the minimum (10) and the three size knit data of the maximum (25), the minimum (15), and an intermediate (35).

FIG. 4 indicates pattern data 10 for the minimum size; pattern data 20 for the maximum size; knit data 15 for the minimum size; knit data 25 for the maximum size; and knit data 35 for an intermediate size generated by the interpolation between the knit data 15 and 25. The species of the knitted product is shoe uppers and they are knitted on flatbed knitting machines. The pattern data 10 and 20 have the outlines corresponding to top-lines 11, 21; insteps 12, 22; left portions 13, 23 of the top-lines; and right portions 14, 24 of the top-lines. The actual pattern data further include the knitted structure within the shoe uppers, but they are omitted.

In the knit data 15, 25, knitting is performed from the bottom portions in the drawing to the top portions (from heel counters to toes), the left-right direction in the drawing is the course direction, and the vertical direction is the wale direction. In the black portions in the drawing, the knitted stitches are absent, and, in the gray portions, the knitted stitches are present. As a remark, these are samely applied to the knit data 35 corresponding to the intermediate size.

The gray bands at the bottom of the knit data 15, 25 indicate band-like top-line portions 16, 26 at the top-lines 11, 21. When the top-line portions 16, 26 are knitted, first, left portions 18, 28 are knitted by flechage, and then, right portions 19, 29 are knitted. The outer peripheries of the left portions, namely, the peripheries in the left side in the drawing, have vertexes and bending points, and the inner peripheries have vertexes due to the flechage knitting. The black portions entering into the left portions 18, 28 from the inside of the knitted fabrics (the right side in the drawing) are caused by flechage knitting and have boundaries in the left portions 18, 28. They are samely applied to the right portions 19, 29.

After knitting the left portions 18, 28 and the right portions 19, 29, insteps 17, 27 are knitted. Pale portions adjacent to the top-lines in the insteps 17, 27 are different in the knitting yarn or the knitting structure from other portions of insteps.

To the knit data 15, 25, the same number of characteristic points are allocated at mutually corresponding positions and the same number of the intermediate points are allocated at mutually corresponding positions. The characteristic points and the intermediate points are interpolated between the knit data 15 and 25, and knitted stitches are allocated within the resultant closed loops. Then, the knit data 35 is produced. The top-line portion 36, the left portion 38, the right portion 39, and the instep 37 have the shapes resultant by the interpolation of the corresponding portions in the knit data 15, 25, respectively.

Figure 5:
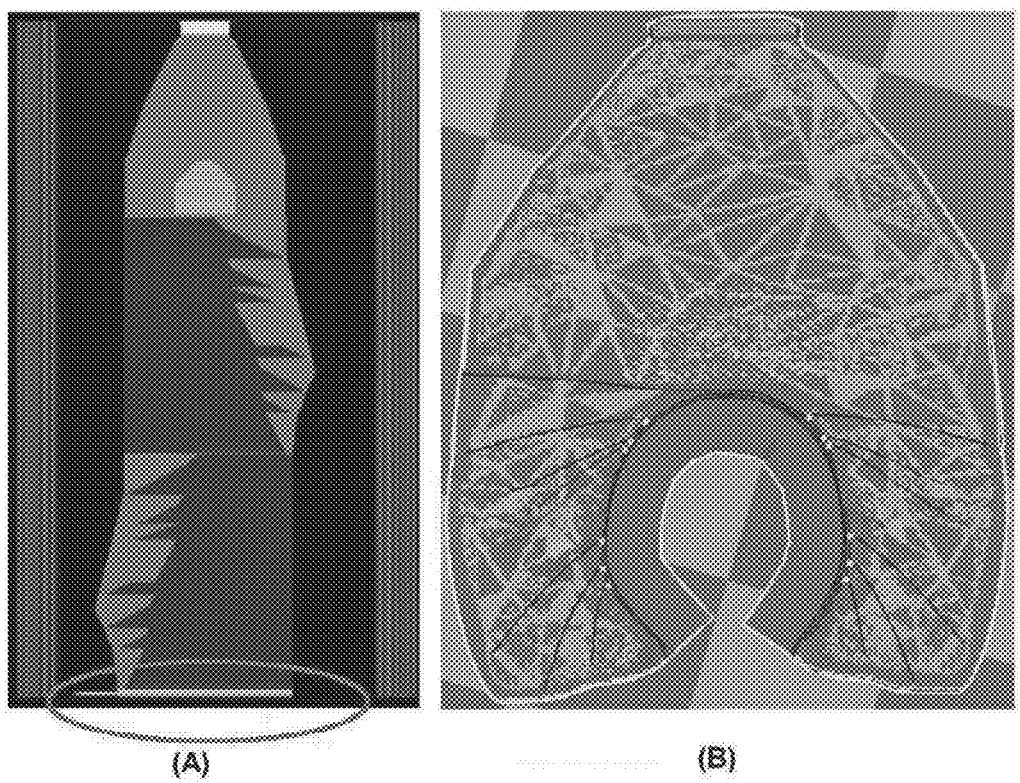
FIG. 5 indicates schematically in (A) knit data for a shoe upper with plenty of flechage knitting and in (B) a simulation image for the knit data, where, in the simulation image, white points indicate the characteristic points and the black lines indicate boundaries between the areas caused by the flechage knitting.

FIG. 5 indicates knit data for a shoe upper for one size in (A) and the simulation image of the knitted fabric knitted according to the knit data in (B). When both sides of the heel counter at the bottom of the drawing are connected in the simulation image (B), a three-dimensional shoe upper is resultant. By the way, the band-like portion at the bottom of the knit data (A) is the knit data for the top-line.

The white points around the top-line in the simulation image represent characteristic points due to flechage knitting. In addition, while characteristic points are present at the outline of the knitted fabric in the simulation image, they are omitted. Further, in the simulation image, black lines dividing the left portions and the right portions represent boundaries within the knitted fabric due to the flechage knitting. As a remark, in the drawing, the boundaries are extended until the outer periphery of the knitted fabric such that the knitted fabric is divided into plural portions.

As is shown in the simulation image, when the characteristic points are allocated, the way for performing the flechage knitting is almost determinable. Therefore, in the example in FIG. 5, it is natural to designate the characteristic points for converting the pattern data into the knit data. On the contrary, regarding a simple pattern data shown in FIG. 7, the characteristic points can be automatically generated after the conversion into the knit data.

Figure 6:
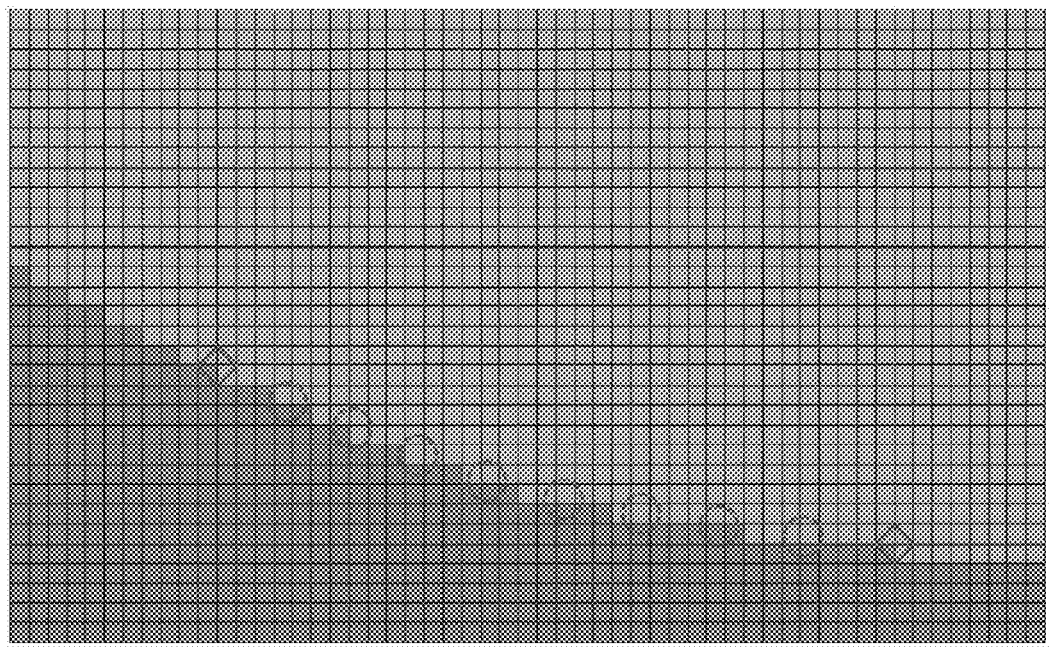
FIG. 6 indicates the characteristic points (open rhombuses) and the intermediate points (open broken circles) in knit data according to the embodiment, where, in Max, those for the maximum size are indicated and, in Min., those for the minimum size are indicated.
Figure 6:
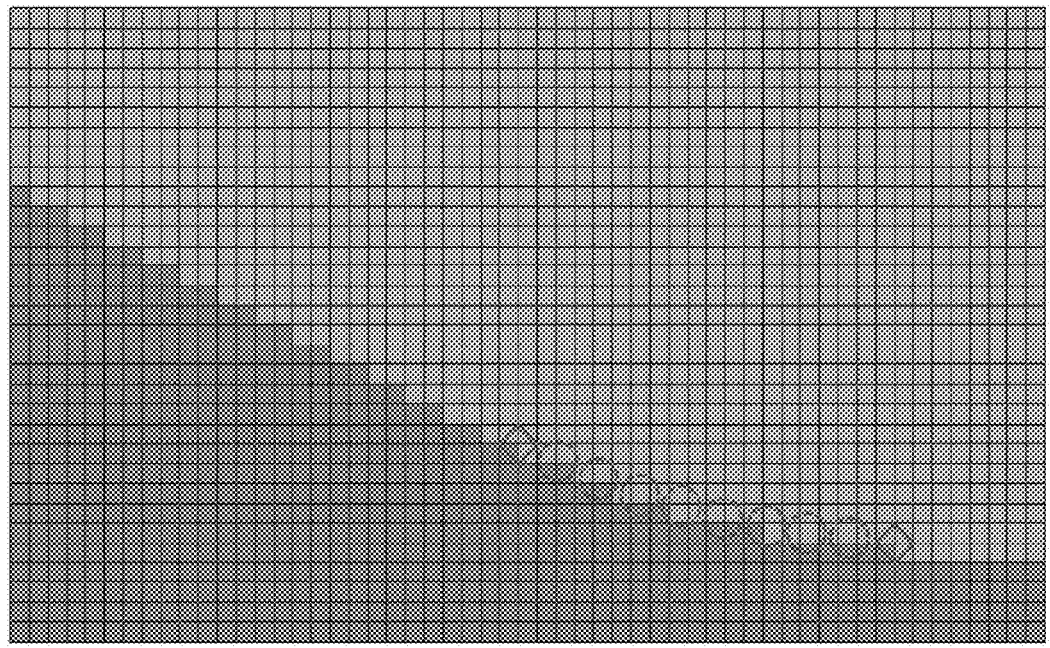

When the characteristic points are designated, the outline and boundaries within the knitted fabric are still somewhat ambiguous between the characteristic points. Therefore, the intermediate points are designated between the characteristic points so as to define the outline of and the boundaries within the knitted fabric. FIG. 6 indicates eight intermediate points (open circle) between characteristic points (open rhombuses) on the minimum size and the maximum size at mutually corresponding positions.

When the characteristic points and the intermediate points are designated, the outline and boundaries within the knitted fabric are determined. Then, these points are connected by vectors in order to generate the closed loops. In the case of FIG. 5(B), there are plural loops, and, in the case of FIG. 7, there are for example two loops.

Since the knitted stitches are allocated within the loops, the areas to allocate the knitted stitches are determined. In addition, the changes in the knitting yarns, the changes in the knitted structures, boundaries due to flechage knitting and so on are designated as the boundaries within the knitted fabric. Further, the species of the knitted stitches or the like are determinable from the initially converted knit data for the two sizes. Therefore, knit data for other sizes are automatically generated.

The characteristic points and the intermediate points are on specific stitches or may be abstract points other than the stitches. Further, the characteristic points and the intermediate points may be shifted from the outline of and the boundaries within the knitted fabric. For example, the outline of a knitted fabric may be shrunk inwardly by one stitch in order to generate the characteristic points and the intermediate points on it and then the outline may be expanded by one stitch in order to allocate the knitted stitches.

Figure 7:
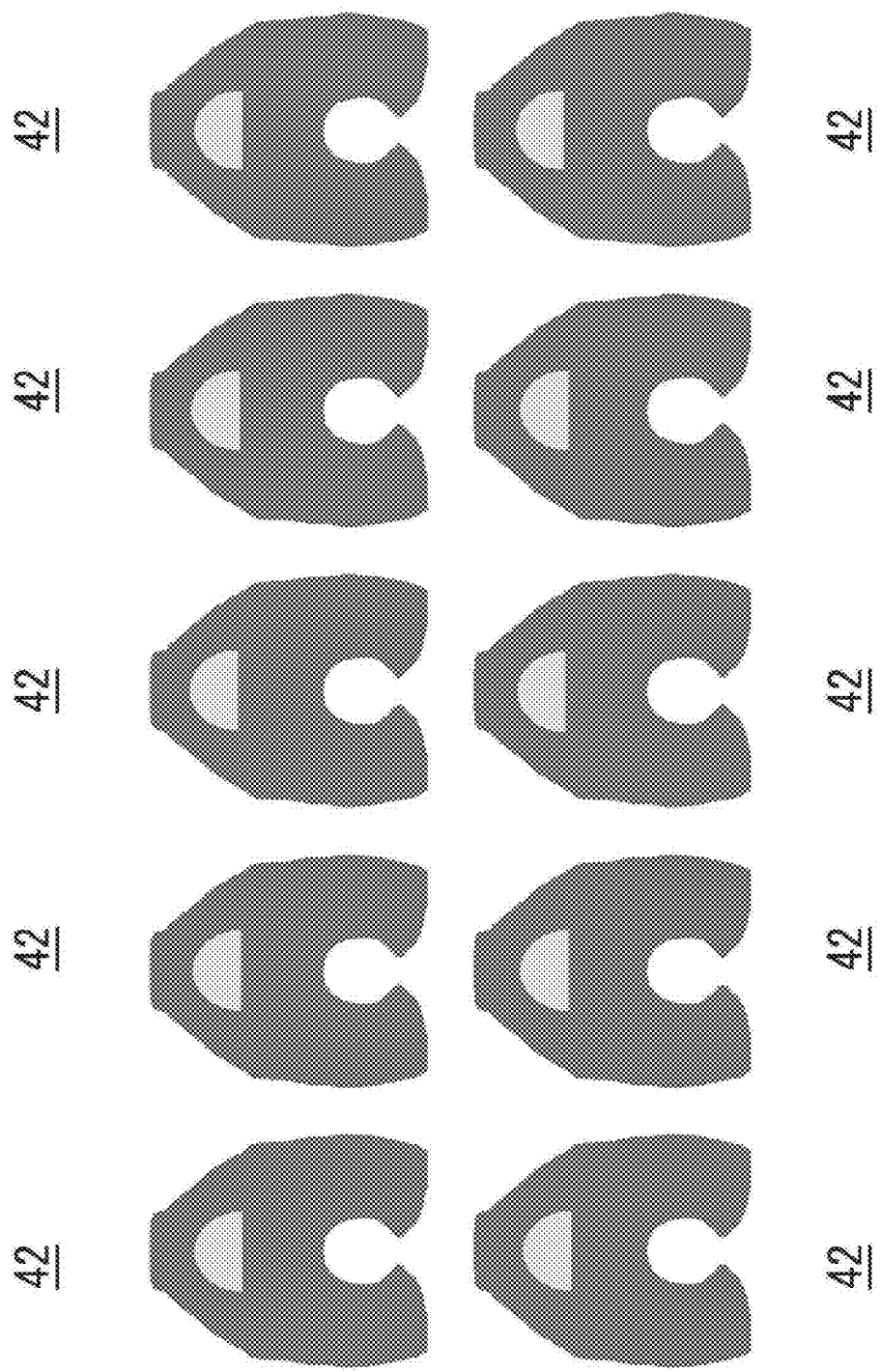
FIG. 7 is a schematic view of the array of pattern data (42) of shoe uppers to be knitted by circular knitting machines.

Knitted products are preferably those knitted by flatbed knitting machines with complex knitting techniques such as flechage knitting but may be simple ones without flechage knitting or the like. Further, circular knitting machines are more suitable for knitted products with simple knitting procedures than flatbed knitting machines. FIG. 7 indicates schematically pattern data for shoe uppers to be knitted by circular knitting machines. Pattern data 42 are arranged on a circular tube, and a circular knitting machine knits a circularly tubular knitted fabric so as to form the shoe uppers corresponding to the pattern data 42.

While the sizes have been dealt with one-dimensionally, for shoe uppers, two-dimensional sizes comprising the length and the width can be dealt with. An example of grading of two-dimensional sizes is indicated in FIG. 8; the length and width of shoe uppers are determined by a principal component (a component comprising mainly the length) and a subcomponent (a component comprising mainly the width). First knit data for at least three sizes of A, B, and C are generated, and the characteristic points and the intermediate points are allocated at mutually corresponding positions. Here, the sizes and the knit data are represented by symbols A to E without distinction between sizes and knit data.

When knit data for the size E is needed, a cross point is determined on an axis connecting A and B (the principal component axis) and also on a vertical line from E to the principal component axis. Then, the knit data for the sizes A and B are interpolated by the ratio of a to b in the drawing so as to generate the knit data at the cross point between the vertical line and the principal component axis as $(b \times A + a \times B)/(a+b)$.

A cross point D is determined on the principal component axis and also on a vertical line from a point corresponding to the size C to the principal component axis. The knit data for the size D is determined according to the interpolation of knit data at the sizes A and B. A further cross point is determined on an axis connecting the size C and size D (subcomponent axis) and also on a vertical line from the size E to the subcomponent axis. Then, changes in knit data from that for the size D is determined as $e \times (C-D)/(d+e)$. This change in knit data is added to $(b \times A + a \times B)/(a+b)$, and the resultant is the knit data for the size E. As a remark, the length-wise axis may be used instead of the principal component axis and the width-wise axis may be used instead of the subcomponent axis for simpler processing.

Now consider knitting apparel products of the sizes determined for individual users. When we consider the two components comprising the length and the width, the procedures similar as those in FIG. 8 are enough. When we consider further components, a space having three-dimensions or more is considered, and interpolation and extrapolation in the space is performed.

While the intermediate points are used in the embodiment, the shape of the knitted products may be approximated by curves or line segments, and the characteristic points may be treated as the endpoints of the curves or the line segments. With using a parameter t which becomes 0 at one endpoint of the curves and 1 at the other endpoint, the shape of the knitted products between the two characteristic points can be approximated by algebraic curves having 2 or higher degree. Of course, when the knitted products have linear shapes between the characteristic points, the shapes may be approximated by line segments. The intermediate shapes refer to these curves, line segments, and the intermediate points in the embodiment, and they are generated by the intermediate point generator 4 automatically or interactively with users.

These curves and line segments can be interpolated or extrapolated between sizes as the intermediate points by interpolation or extrapolation between or from points having the same t value. The interpolation or extrapolation generates a curve or a line segment representing the characteristic points and the intermediate shape. Then, when connecting the characteristic points and the intermediate points in order, a closed loop is generated. Since the characteristic points are the endpoints of the curves or the line segments, the interpolation or extrapolation between or from the characteristic points means the interpolation or extrapolation between or from the endpoints of the curves or the line segments. Further, the connection of the characteristic points and the intermediate shapes refers to the connection of curves and line segments forming the intermediate shapes such that the endpoints are mutually connected.

DESCRIPTION OF SYMBOLS 1 data converter
2 user interface
3 characteristic point generator
4 intermediate point generator (intermediate shape generator)
5 memory
6 interpolation and extrapolation unit
7 loop generator
8 output buffer
10, 20 pattern data
11, 21 top-line
12, 22 instep
13, 23 left portion
14, 24 right portion
15, 25, 35 knit data
16,26,36 top-line portion
17,27,37 instep
18,28,38 left portion
19,29,39 right portion
42 pattern data

The invention claimed is:

1. A grading method for original knitted products, utilizing a grading system programmed and configured to generate knit data of a plurality of knitted products mutually different in sizes thereof, for driving knitting machines by the desired knit data of desired sizes for resized knitted products of a common design from a combination of initial knit data of two sizes of original knitted products, wherein knitting machines are driven by the desired knit data, wherein the method comprises the following steps performed by the grading system:
   a: converting pattern data of the two sizes of the original knitted products to be graded to the combination of initial knit data;
   b: modifying the the combination of initial knit data based on test knitting and/or computer simulations of the original knitted products to modified knit data;
   c: generating characteristic points specifying shapes of the original knitted products regarding the modified knit data for said two sizes, automatically or interactively based upon a user's inputs, wherein the characteristic points specify characteristics of the modified knit data;
   d: generating intermediate shapes specifying the shapes of the original knitted products between the characteristic points, automatically or interactively based upon the user's inputs;
   e: interpolating or extrapolating the characteristic points and the intermediate shapes according to the desired sizes of the resized knitted products so as to generate characteristic points and intermediate shapes for the desired sizes;
   f: generating closed loops by connecting the characteristic points and the intermediate shapes for the desired sizes; and
   g: generating the desired knit data for the desired sizes so as to allocate knitted stitches within patterns specified by the closed loops.

2. The grading method according to claim 1, wherein said step d comprises generating intermediate points between said characteristic points of the original knitted products, automatically or interactively based upon the user's inputs, wherein the intermediate points specify the shapes of the original knitted products as said intermediate shapes,
   wherein said step e comprises interpolating or extrapolating the characteristic points of the original knitted products generated in said step c and the intermediate points, generated in step d according to the desired sizes of the resized knitted products so as to generate the characteristic points and the intermediate points for the desired sizes, and
   said step f comprises generating the closed loops by connecting the characteristic points and the intermediate points for the desired sizes.

3. The grading method according to claim 2, wherein in said steps c and d, said characteristic points and said intermediate points of the original knitted products are generated so as to specify both outer shapes of the original knitted products and at least a boundary within the original knitted products produced according to a knitting process of the original knitted products.

4. The grading method according to claim 3, wherein said knitting process includes flechage knitting and said boundary includes at least a boundary caused by the flechage knitting.

* * * * *